(12) United States Patent
Park

(10) Patent No.: US 10,247,532 B2
(45) Date of Patent: Apr. 2, 2019

(54) TUBING PIPE SIZING TOOL

(71) Applicant: Kwon J. Park, Diamond Bar, CA (US)

(72) Inventor: Kwon J. Park, Diamond Bar, CA (US)

( * ) Notice: Subject to any disclaimer, the term of this patent is extended or adjusted under 35 U.S.C. 154(b) by 122 days.

(21) Appl. No.: 15/243,096

(22) Filed: Aug. 22, 2016

(65) Prior Publication Data

US 2018/0051972 A1    Feb. 22, 2018

(51) Int. Cl.
*G01B 3/34* (2006.01)

(52) U.S. Cl.
CPC .................... *G01B 3/34* (2013.01)

(58) Field of Classification Search
CPC ........................................................ G01B 3/34
USPC ............ 33/21.1, 21.3, 27.12, 41.6, 529, 562
See application file for complete search history.

(56) References Cited

U.S. PATENT DOCUMENTS

| | | | | |
|---|---|---|---|---|
| 81,402 A | * | 8/1868 | Peace | B23D 21/10 30/95 |
| 184,652 A | * | 11/1876 | Muller | B23D 21/10 30/95 |
| 724,185 A | * | 3/1903 | Hughes | B23D 51/025 269/140 |
| 1,055,970 A | * | 3/1913 | Erickson | B23D 21/10 30/95 |
| 1,381,075 A | * | 6/1921 | Louden | B25B 27/12 33/555.4 |
| 1,683,953 A | * | 9/1928 | Carr | G01B 3/14 266/54 |
| 1,775,402 A | * | 9/1930 | Mandl | B25B 13/56 81/177.75 |
| 1,781,634 A | * | 11/1930 | Fenk | B23G 7/00 33/520 |
| 1,915,924 A | * | 6/1933 | Coe | B23D 21/02 24/279 |
| 2,009,671 A | * | 7/1935 | Mueller | B25H 7/005 33/21.1 |
| 2,093,639 A | * | 9/1937 | Markwick | G01B 3/30 33/501.08 |
| 2,155,705 A | * | 4/1939 | Gottwald | B23Q 35/42 24/271 |
| 2,282,148 A | * | 5/1942 | Mandl | B25G 1/043 16/422 |
| 2,557,702 A | * | 6/1951 | Brady | G01B 5/12 33/542 |
| 2,563,063 A | * | 8/1951 | Peterson | G01B 3/34 33/199 R |
| 2,578,261 A | * | 12/1951 | Orr | G01B 3/48 33/199 R |
| 2,607,126 A | * | 8/1952 | Sekki | B25H 7/005 33/21.3 |

(Continued)

*Primary Examiner* — Justin Seo
*Assistant Examiner* — Tania C Courson
(74) *Attorney, Agent, or Firm* — John K. Park; Park Law Firm

(57) ABSTRACT

A tubing pipe sizing tool is provided, comprising a main body, a measuring portion, a handle-installing hole, a bump portion, and a handle. The measuring portion is provided on a first part of the main body in a first direction. The handle-installing hole is provided on a second part of the main body in a second direction perpendicular to the first direction. The bump portion is provided around an opening of the handle-installing hole. The handle is configured to engage the handle-installing hole and facilitate pipe sizing. The main body may have a cylindrical shape, and the bump portion facilitates to handle the tool.

7 Claims, 3 Drawing Sheets

(56) References Cited

U.S. PATENT DOCUMENTS

| | | | | |
|---|---|---|---|---|
| 2,651,230 | A * | 9/1953 | Waterval | B25B 13/06 81/124.3 |
| 2,717,454 | A * | 9/1955 | Sekki | B25H 7/005 33/529 |
| 2,874,475 | A * | 2/1959 | McGaffey | G01B 5/163 33/456 |
| 2,932,225 | A * | 4/1960 | Gardner | B21D 7/063 72/31.05 |
| 2,937,440 | A * | 5/1960 | Kelly | B23D 21/08 30/101 |
| 2,985,963 | A * | 5/1961 | Lee | B23K 7/006 266/58 |
| 3,128,560 | A * | 4/1964 | McKenzie | B25H 7/00 33/529 |
| 3,209,459 | A * | 10/1965 | Fish, Jr. | B23D 51/025 33/529 |
| 3,396,467 | A * | 8/1968 | Scocozza | B23D 21/10 30/357 |
| 3,513,556 | A * | 5/1970 | Holland | G01B 5/12 33/544.4 |
| 3,732,618 | A * | 5/1973 | Lorenz | B23D 21/04 30/97 |
| 4,091,533 | A * | 5/1978 | Saumell | B23D 21/10 30/116 |
| 4,146,959 | A * | 4/1979 | Hopper | B26D 3/169 30/95 |
| 4,216,586 | A * | 8/1980 | Long | G01B 3/46 33/544.4 |
| 4,274,208 | A * | 6/1981 | Yakkel | G01C 9/28 33/371 |
| 4,381,854 | A * | 5/1983 | Bruner | B23K 7/10 266/54 |
| 4,440,517 | A * | 4/1984 | Potter | F16B 7/105 16/429 |
| 4,466,193 | A * | 8/1984 | Astle | B25H 7/005 33/21.1 |
| 4,581,958 | A * | 4/1986 | Shull | B25G 1/043 403/109.3 |
| 4,618,378 | A * | 10/1986 | Huckaby | B23K 7/10 148/201 |
| 4,696,208 | A * | 9/1987 | Lay | B25B 13/462 81/58 |
| 4,835,873 | A * | 6/1989 | Weems | F16B 7/182 33/21.3 |
| 4,947,555 | A * | 8/1990 | Allen, III | G01B 3/36 33/199 R |
| 5,050,310 | A * | 9/1991 | Jiles | B23B 5/167 33/501.45 |
| 5,099,726 | A * | 3/1992 | Hsiao | B25B 13/48 81/177.2 |
| 5,134,783 | A * | 8/1992 | Perry | G01B 3/36 33/199 R |
| 5,199,180 | A * | 4/1993 | Yablonsky | G01B 3/30 33/501.45 |
| 5,450,677 | A * | 9/1995 | Casey | B25H 7/005 33/373 |
| 5,479,721 | A * | 1/1996 | Wickander | G01B 5/241 33/531 |
| 5,927,141 | A * | 7/1999 | Walsten | B21D 7/14 72/31.04 |
| D440,841 | S * | 4/2001 | Murphy | D8/29 |
| 6,601,312 | B1 * | 8/2003 | Phuly | B23K 9/0286 33/412 |
| 6,904,690 | B2 * | 6/2005 | Bakke | G01B 3/34 33/1 H |
| 6,996,913 | B2 * | 2/2006 | Lum | G01B 7/063 33/550 |
| 7,003,893 | B1 * | 2/2006 | Phuly | B23K 9/0286 33/412 |
| 7,089,827 | B2 * | 8/2006 | Wexler | B25B 13/481 81/169 |
| 7,316,069 | B2 * | 1/2008 | Graybeal | B23D 33/02 30/103 |
| 7,926,196 | B2 * | 4/2011 | Mueller | B43L 13/205 33/529 |
| 8,875,411 | B2 * | 11/2014 | Al-Dhafiri | G01B 3/26 33/21.1 |
| D722,898 | S * | 2/2015 | Bailey | D10/70 |
| 9,194,766 | B2 * | 11/2015 | Fitzpatrick, Jr. | G01M 17/013 |
| 9,689,653 | B2 * | 6/2017 | Baskovic | G01B 3/20 |
| 2010/0281700 | A1 | 11/2010 | Wu | G01B 3/48 33/199 R |
| 2011/0030231 | A1 * | 2/2011 | Mueller | B43L 13/205 33/529 |
| 2014/0068954 | A1 * | 3/2014 | Al-Dhafiri | G01B 3/08 33/21.1 |
| 2015/0020393 | A1 * | 1/2015 | Shallcross | G01B 5/204 33/199 R |
| 2016/0377404 | A1 * | 12/2016 | Berthou | G01B 3/34 33/199 R |

* cited by examiner

Fig. 4
Fig. 5
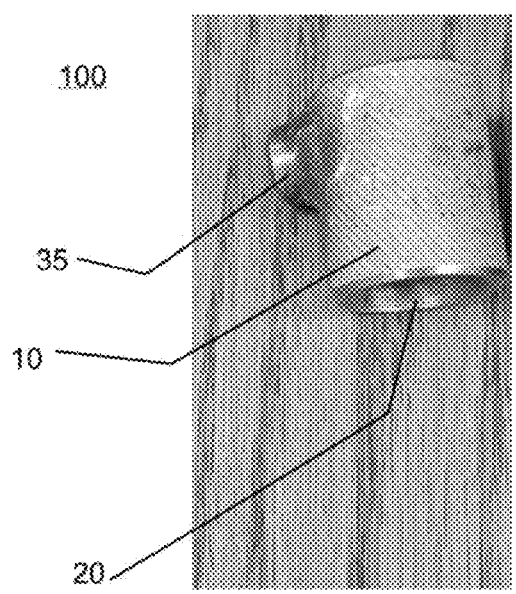
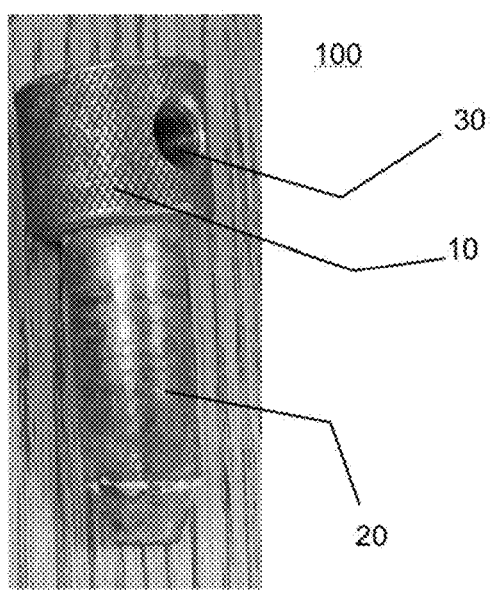
Fig. 6
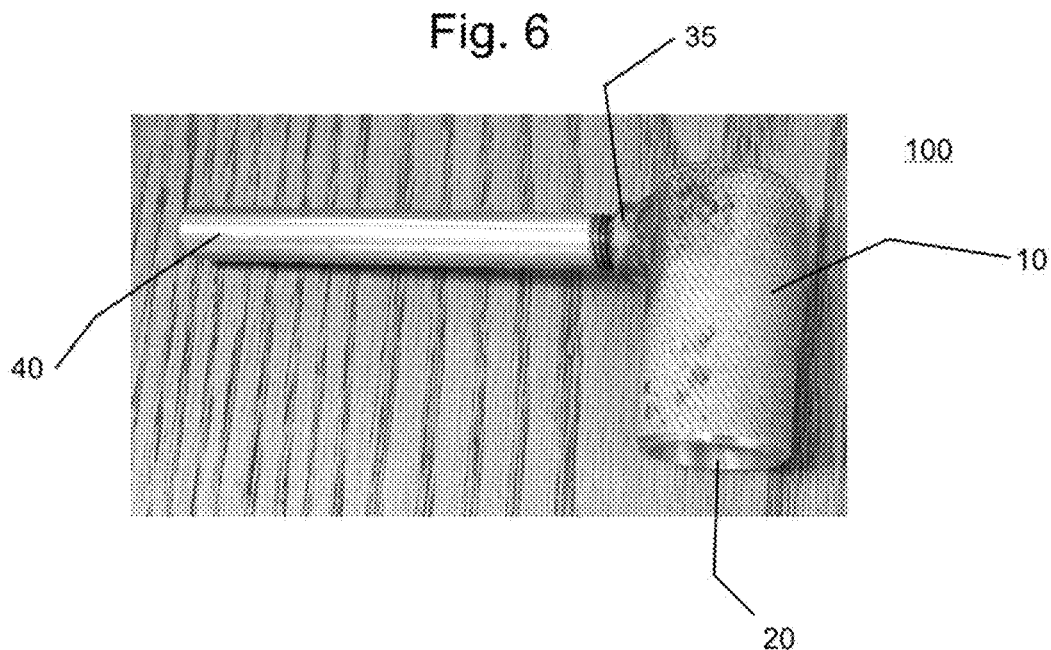

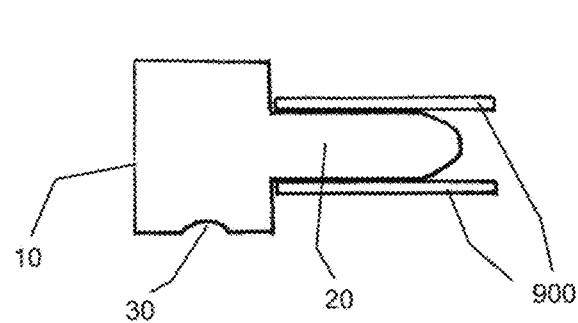
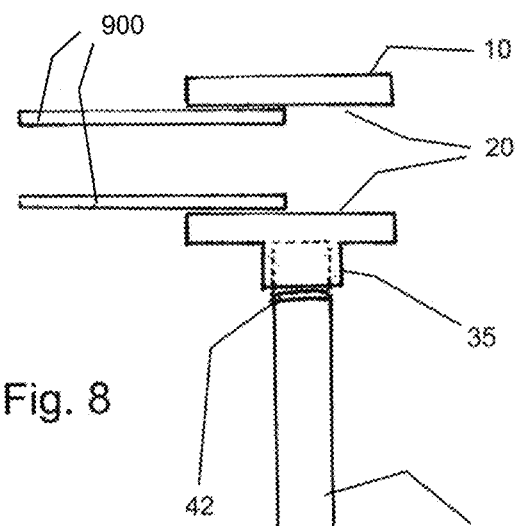
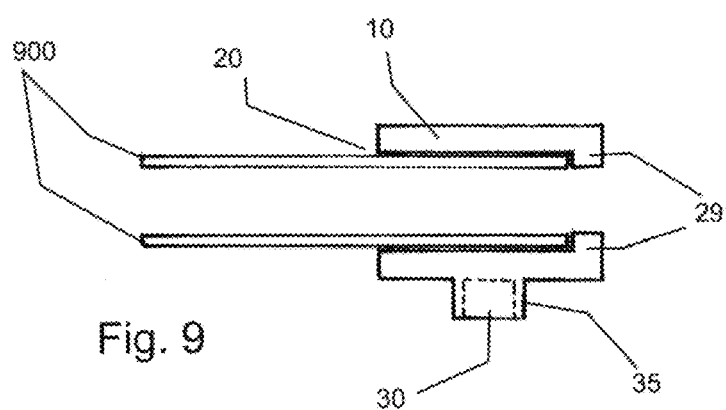
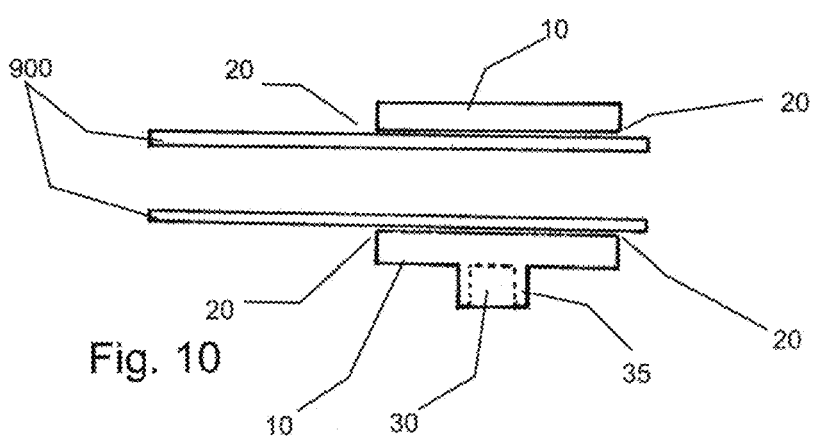

TUBING PIPE SIZING TOOL

BACKGROUND OF THE INVENTION

The present invention relates to a tubing pipe sizing tool.

In plumbing, sizing tubes is an important job for the plumber to do frequently and conventionally.

The above cannot be more true when the work environment is narrow or crowded places. In such a limited space, the plumber cannot use two hands or bulky tools. Therefore, it would be very grateful if the plumber can do his or her works with a single hand or an inventive tool that enables the user to use a single hand to do the job done.

Accordingly, a need for a tubing pipe sizing tool has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a tubing pipe sizing tool, which facilitates the plumber's job in sizing the pipes.

An aspect of the invention provides a tubing pipe sizing tool, comprising a main body, a measuring portion, a handle-installing hole, a bump portion, and a handle.

The measuring portion is provided on a first part of the main body in a first direction.

The handle-installing hole is provided on a second part of the main body in a second direction perpendicular to the first direction.

The bump portion is provided around an opening of the handle-installing hole.

The handle is configured to engage the handle-installing hole and facilitate pipe sizing.

The main body may have a cylindrical shape. However, it is not limiting. For example, the outer shape can be a polygon as long as to accommodate the other components such as the measuring portion.

The measuring portion may be provided along a central axis of the cylindrical shape of the main body.

The measuring portion may comprise a measuring cylinder portion protruding in the first direction for measuring a first size or inner diameter of an external pipe.

The measuring portion may comprise a measuring tube portion extending in the first direction for measuring a second size or outer diameter of an external pipe.

The handle-installing hole may be bored into a side of the cylindrical shape of the main body.

The handle-installing hole may comprise a helical female thread provided on the inner surface of the handle-installing hole.

The handle may comprise a helical male thread on an end portion of the handle, so as to engage the helical female thread of the handle-installing hole.

The main body, the measuring portion, and the handle-installing hole may be made monolithically.

The main body, the measuring portion, the handle-installing hole, and the handle may be made of metal.

The bump portion may have a cylindrical shape protruding in the direction of the handle, configured for being hit loose by an external force.

The measuring portion may comprise a measuring tube portion extending in the first direction for measuring a second size or outer diameter of an external pipe, and the measuring tube portion has a specific measuring depth.

The measuring tube portion have a measuring length along the entire length of the measuring portion, so that the measuring tub portion is used bidirectionally and all the way through.

The measuring tube portion may be provided with a plurality of diameters and lengths.

The advantages of the present invention are: (1) the tubing pipe sizing tool according to the invention enables the user to measure the sizes of pipes in a difficult condition; and (2) the tubing pipe sizing tool according to the present invention provides means to make handling of the tool easy and convenient.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 4 is a perspective side view of the tubing pipe sizing tool for measuring an outer diameter of a pipe of FIG. 1;

FIG. 5 is a perspective side view of a tubing pipe sizing tool for measuring an inner diameter of a pipe of FIG. 2;

FIG. 6 is a perspective side view of a tubing pipe sizing tool for measuring an outer diameter of a pipe of FIG. 3 according to an embodiment of the invention;

FIG. 7 is a conceptual side cross-sectional view showing a tubing pipe sizing tool for measuring an inner diameter of a pipe according to an embodiment of the invention;

FIG. 8 is a conceptual side cross-sectional view showing a tubing pipe sizing tool for measuring an outer diameter of a pipe according to an embodiment of the invention;

FIG. 9 is a conceptual side cross-sectional view showing a tubing pipe sizing tool for measuring an outer diameter of a pipe with a stop according to an embodiment of the invention; and FIG. 10 is a conceptual side cross-sectional view showing a tubing pipe sizing tool for measuring an outer diameter of a pipe without a stop according to an embodiment of the invention;

DETAILED DESCRIPTION EMBODIMENTS OF THE INVENTION

Figure 1:
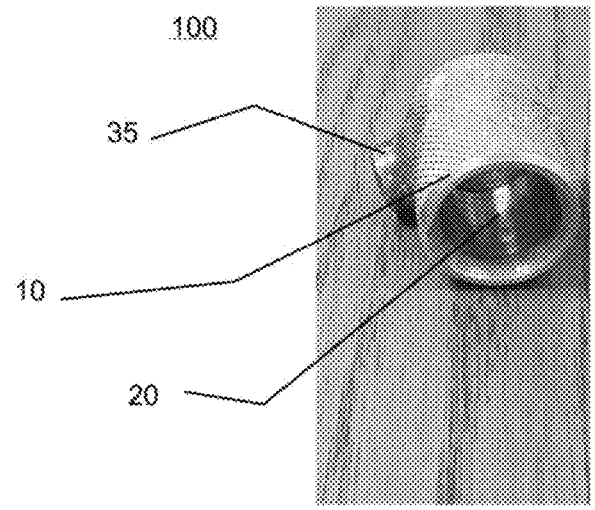
FIG. 1 is a perspective view of a tubing pipe sizing tool for measuring an outer diameter of a pipe according to an embodiment of the invention.

Referring to the figures, the embodiments of the invention are described in detail.

An object of the invention is to provide a tubing pipe sizing tool, which facilitates the plumber's job in sizing the pipes.

FIGS. 1 through 6 show various tubing pipe sizing tools according to embodiments of the invention, and FIGS. 7 through 10 show how the tubing pipe sizing tools are used in a couple of situations.

An aspect of the invention provides a tubing pipe sizing tool 100, comprising a main body 10, a measuring portion 20, a handle-installing hole 30, a bump portion 35, and a handle 40 as shown in FIGS. 1, 4, 7, and 8. Alternatively, in FIGS. 2 and 5, the tubing pipe sizing tool 100 for measuring inner size comprises a main body 10' and a measuring portion 20'.

The measuring portion 20 (20') is provided on a first part of the main body 10 (10') in a first direction.

The handle-installing hole 30 is provided on a second part of the main body 20 (20') in a second direction perpendicular to the first direction.

The bump portion 35 is provided around an opening 30' of the handle-installing hole 30 as shown in FIGS. 8 and 9.

The handle 40 is configured to engage the handle-installing hole 30 and facilitate pipe sizing.

The main body 10 (10') may have a cylindrical shape. However, it is not limiting. For example, the outer shape can be a polygon as long as to accommodate the other components such as the measuring portion.

The measuring portion 20 (20') may be provided along a central axis of the cylindrical shape of the main body 10 (10').

Figure 2:
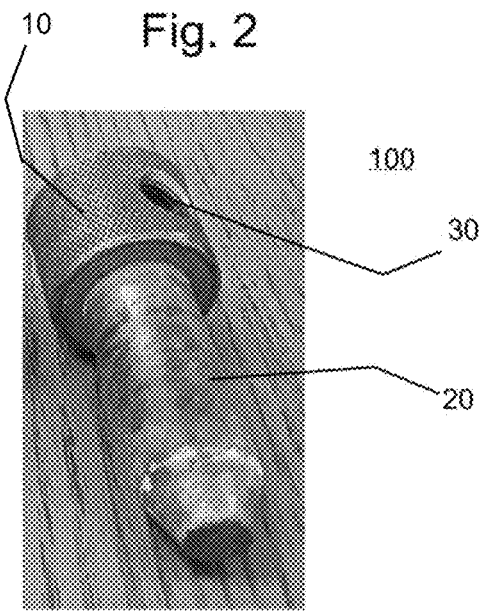
FIG. 2 is a perspective view of a tubing pipe sizing tool for measuring an inner diameter of a pipe according to an embodiment of the invention.
Figure 3:
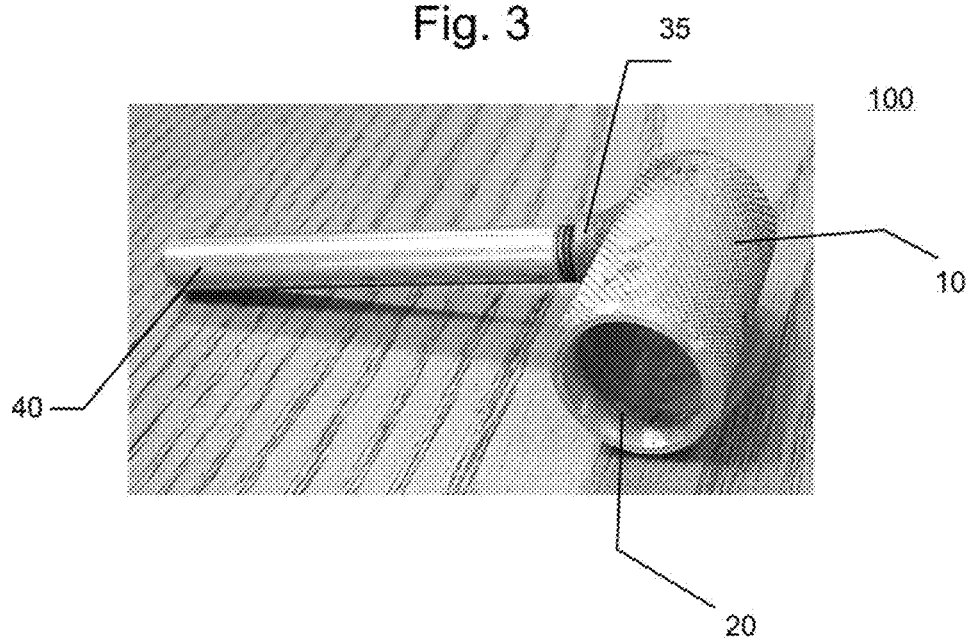
FIG. 3 is a perspective view of a tubing pipe sizing tool for measuring an outer diameter of a pipe with a handle installed according to an embodiment of the invention.

The measuring portion 20' may comprise a measuring cylinder portion protruding in the first direction for measuring a first size or inner diameter of an external pipe 900 as shown in FIGS. 2, 5, and 7.

Alternatively the measuring portion 20 may comprise a measuring tube portion extending in the first direction for measuring a second size or outer diameter of an external pipe 900 as shown FIGS. 1, 3, 4, 6, and 8.

The handle-installing hole 30 may be bored into a side of the cylindrical shape of the main body 10 (10') as shown in FIGS. 7 and 8.

The handle-installing hole 30 may comprise a helical female thread provided on the inner surface of the handle-installing hole 30 as shown indirectly in FIG. 8.

The handle 40 may comprise a helical male thread 42 on an end portion of the handle 40, so as to engage the helical female thread of the handle-installing hole 30 as shown in FIG. 8.

The main body 10 (10'), the measuring portion 20 (20'), and the handle-installing hole 30 may be made monolithically.

The main body 10 (10'), the measuring portion 20 (20'), the handle-installing hole 30, and the handle 40 may be made of metal.

The bump portion 35 may have a cylindrical shape protruding in the direction of the handle 30, configured for being hit loose by an external force. Sometimes, when the plumber inserted the tool 100 in the external pipe 900, the tool 100 may be stuck in there. If the space is small or crowded, it is very challenging to retrieve the tool 100 from the pipe 900. In such a situation, the handle 40 helps a lot, and next the bump portion 35 can be a simple solution. If the bump portion 35 be hit by a hammer or so, the tool 100 can be loose and retrieved.

The measuring portion 20 may comprise a measuring tube portion extending in the first direction for measuring a second size or outer diameter of an external pipe, and the measuring tube portion has a specific measuring depth as shown in FIGS. 1, 3, 4, 6, and 8.

The measuring tube portion have a measuring length along the entire length of the measuring portion, so that the measuring tube portion can be used bidirectionally and all the way through as shown in FIG. 10. This features can be very useful in a copper coupling without a stop. As far as the inventor knows, there has been no such a convenient tool for the specific job.

Alternatively, the measuring tube portion may comprise a stopper 29 provided at a rear end thereof, so as to limit the insertion of the pipe 900 into the measuring tube portion.

The measuring tube portion may be provided with a plurality of diameters and lengths. The diameter may include a half inch, three quarters inch, one and a quarter inch, etc.

A preferably set of tools for sizing of pipe of one specific diameter may contain a first tool 100 for measuring an inner diameter of pipe, a second tool 100 for measuring an outer diameter of pipe (a short one or a first length or depth), a third tool 100 for measuring an outer diameter of pipe (a long one or a second length or depth), and a handle 40.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A tubing pipe sizing tool comprising:
   a main body;
   a measuring portion provided on a first part of the main body in a first direction;
   a handle-installing hole provided on an external surface of the main body on a second part of the main body in a second direction perpendicular to the first direction;
   a bump portion provided around an opening of the handle-installing hole; and
   a handle engaging the handle-installing hole fixedly facilitates pipe sizing,
   wherein the main body has a cylindrical shape,
   wherein the measuring portion is provided along a central axis of the cylindrical shape of the main body,
   wherein the measuring portion comprises a measuring tube portion extending in the first direction for measuring an outer diameter of an external pipe,
   wherein the main body, the measuring portion, and the handle-installing hole are monolithic, and
   wherein the bump portion has a cylindrical shape protruding in the direction of the handle, configured for being hit loose by an external force.

2. The tubing pipe sizing tool of claim 1, wherein the handle-installing hole is bored into a side of the cylindrical shape of the main body.

3. The tubing pipe sizing tool of claim 2, wherein the handle-installing hole comprises a helical female thread provided on the inner surface of the handle-installing hole.

4. The tubing pipe sizing tool of claim 3, wherein the handle comprises a helical male thread on an end portion of the handle, which is configured to engage the helical female thread of the handle-installing hole.

5. The tubing pipe sizing tool of claim 1, wherein the main body, the measuring portion, the handle-installing hole, and the handle are made of metal.

6. The tubing pipe sizing tool of claim 1, wherein the measuring tube portion further comprises a stopper provided at a rear end thereof, which is configured to limit the insertion of the external pipe into the measuring tube portion, allowing the measuring tube portion to have a specific measuring depth.

7. The tubing pipe sizing tool of claim 6, wherein the measuring tube portion has a measuring length along the entire length of the measuring portion, allowing the measuring tube portion to be used bidirectionally and all the way through.

\* \* \* \* \*